United States Patent
Fumagalli

(10) Patent No.: US 11,084,004 B2
(45) Date of Patent: Aug. 10, 2021

(54) DEVICE FOR MIXING WATER AND DIESEL OIL, APPARATUS AND PROCESS FOR PRODUCING A WATER/DIESEL OIL MICRO-EMULSION

(71) Applicant: EME Finance Limited, London (GB)

(72) Inventor: Enrico Fumagalli, Paradiso (CH)

(73) Assignee: EME International Lux S.A., Grand Duchy of Luxembourg (LU)

( * ) Notice: Subject to any disclaimer, the term of this patent is extended or adjusted under 35 U.S.C. 154(b) by 0 days.

(21) Appl. No.: 17/000,869

(22) Filed: Aug. 24, 2020

(65) Prior Publication Data

US 2020/0384428 A1   Dec. 10, 2020

Related U.S. Application Data

(62) Division of application No. 15/525,735, filed as application No. PCT/EP2015/074594 on Oct. 23, 2015, now Pat. No. 10,751,675.

(30) Foreign Application Priority Data

Nov. 10, 2014   (IT) .......................... MI2014A001931

(51) Int. Cl.
   *B01F 3/08*   (2006.01)
   *B01F 5/06*   (2006.01)
   (Continued)

(52) U.S. Cl.
   CPC .......... *B01F 3/0807* (2013.01); *B01F 5/0608* (2013.01); *B01F 5/0688* (2013.01);
   (Continued)

(58) Field of Classification Search
   CPC .... B01F 5/0688; B01F 5/0689; B01F 3/0807; B01J 19/2475; B01J 9/2475; F02M 25/0228
   See application file for complete search history.

(56) References Cited

U.S. PATENT DOCUMENTS 1,540,592 A   6/1925   Best
2,271,982 A   2/1942   Van Kreveld
(Continued)

FOREIGN PATENT DOCUMENTS

CN   1240815 A   1/2000
CN   103627458 A   3/2014
(Continued)

OTHER PUBLICATIONS

Lif, Anna et al., Fischer-Tropsch Diesel Emulsions Stabilised by Microfibrillated Cellulose and Nonionic Surfactants, Journal of Colloid and Interface Science, vol. 352, Issue 2, Dec. 15, 2010, pp. 585-592.

(Continued)

*Primary Examiner* — Elizabeth Insler
(74) *Attorney, Agent, or Firm* — Boyle Fredrickson, S.C.

(57) ABSTRACT

An apparatus and process for preparing a water/diesel oil micro-emulsion including a diesel oil feeding unit, an emulsifying composition feeding unit, a water feeding unit, and a mixing tank in fluid communication therewith. A duct extends along main direction (X-X) and presents an inlet opening, outlet nozzle, and a cone shaped septum coaxial with respect to the main direction (X-X) and tapers towards the outlet nozzle. A plurality of holes is in the conical wall of the septum and a plurality of lamellae is arranged in the duct downstream of the septum. The plurality of lamellae creates a plurality of small chambers. Holes and the small chambers delimit a labyrinth passageway for liquid flowing through the duct towards the outlet nozzle. A batch is recirculated through the mixing tank and a conduit including a mixing device and then the fuel micro-emulsion batch is discharged.

17 Claims, 5 Drawing Sheets

(51) Int. Cl.
  *B01F 5/10* (2006.01)
  *B01F 13/10* (2006.01)
  *F23K 5/12* (2006.01)
  *F02M 25/022* (2006.01)

(52) U.S. Cl.
  CPC .............. *B01F 5/0689* (2013.01); *B01F 5/10* (2013.01); *B01F 13/1027* (2013.01); *F02M 25/0228* (2013.01); *F23K 5/12* (2013.01); *B01F 2003/0834* (2013.01); *B01F 2003/0842* (2013.01); *B01F 2003/0849* (2013.01); *Y02T 10/12* (2013.01)

(56) References Cited

U.S. PATENT DOCUMENTS

| | | | |
|---|---|---|---|
| 2,391,110 A * | 12/1945 | Walker | 366/131 |
| 3,759,450 A | 9/1973 | Fram et al. | |
| 4,135,829 A | 1/1979 | Grillo et al. | |
| 4,352,572 A | 10/1982 | Chen et al. | |
| 4,592,507 A | 6/1986 | Benedict | |
| 4,597,671 A | 7/1986 | Marelli | |
| 4,725,287 A | 2/1988 | Gregoli et al. | |
| 5,362,762 A | 11/1994 | Beshouri | |
| 5,851,245 A | 12/1998 | Moriyama et al. | |
| 6,068,670 A | 5/2000 | Haupais et al. | |
| 6,206,307 B1 | 3/2001 | Arnold et al. | |
| 6,211,253 B1 | 4/2001 | Marelli | |
| 6,296,676 B1 | 10/2001 | Nohara | |
| 7,887,604 B1 | 12/2011 | Hicks et al. | |
| 10,316,264 B2 | 6/2019 | Fumagalli | |
| 10,751,675 B2 | 8/2020 | Fumagalli | |
| 2002/0088167 A1 | 7/2002 | Filippini et al. | |
| 2003/0008252 A1 | 1/2003 | Watanabe | |
| 2003/0024852 A1 | 2/2003 | Huffer et al. | |
| 2003/0079467 A1 | 5/2003 | Liu et al. | |
| 2003/0134755 A1 | 7/2003 | Martin | |
| 2004/0055210 A1 | 3/2004 | Lif et al. | |
| 2004/0191708 A1 | 9/2004 | Matoba et al. | |
| 2004/0229765 A1 | 11/2004 | Gutierrez et al. | |
| 2005/0090565 A1 | 4/2005 | Sprague | |
| 2005/0183324 A1 | 8/2005 | Marelli | |
| 2006/0048443 A1 | 3/2006 | Filippini et al. | |
| 2007/0028507 A1 | 2/2007 | Strey et al. | |
| 2007/0087104 A1 | 4/2007 | Chanamai | |
| 2007/0113938 A1 | 5/2007 | Kim | |
| 2007/0261293 A1 | 11/2007 | Tajima et al. | |
| 2008/0312346 A1 | 12/2008 | McCall et al. | |
| 2009/0118380 A1 | 5/2009 | Del Guadio et al. | |
| 2009/0300969 A1 | 12/2009 | Martin | |
| 2010/0037513 A1 | 2/2010 | Petrucci et al. | |
| 2010/0270211 A1 | 10/2010 | Wolny | |
| 2010/0290307 A1 | 11/2010 | Gordon et al. | |
| 2011/0026358 A1 | 2/2011 | Cheio De Oliveira et al. | |
| 2011/0117019 A1 | 5/2011 | Hawkins | |
| 2012/0069898 A1 | 3/2012 | Pack et al. | |
| 2012/0079760 A1 | 4/2012 | Savage et al. | |
| 2012/0167451 A1 | 7/2012 | Festuccia | |
| 2012/0255886 A1 | 10/2012 | Flores Oropeza et al. | |
| 2012/0291339 A1 | 11/2012 | Martin et al. | |
| 2013/0118058 A1 | 5/2013 | Nguyen et al. | |
| 2013/0021871 A1 | 6/2013 | Strahmann | |
| 2013/0215706 A1 | 8/2013 | Markert et al. | |
| 2014/0121423 A1 | 5/2014 | Powell et al. | |
| 2014/0202702 A1 | 7/2014 | Cobb | |
| 2014/0311020 A1 | 10/2014 | Klausmeier et al. | |
| 2015/0001135 A1 | 1/2015 | Gattupalli et al. | |
| 2020/0384428 A1 | 12/2020 | Fumagalli | |

FOREIGN PATENT DOCUMENTS

| | | |
|---|---|---|
| DE | 19932276 A1 | 1/2001 |
| DE | 19945508 A1 | 4/2001 |
| DE | 202004019745 U1 | 2/2005 |
| DE | 102007043302 A1 | 3/2009 |
| EP | 0595640 A1 | 10/1993 |
| EP | 0771629 A1 | 5/1997 |
| EP | 0958853 A1 | 11/1999 |
| EP | 1152049 A2 | 11/2001 |
| EP | 1489130 A1 | 12/2004 |
| EP | 1433748 A2 | 6/2006 |
| EP | 2532959 A2 | 12/2012 |
| EP | 2612898 A1 | 7/2013 |
| FR | 2461515 A1 | 2/1981 |
| FR | 2929133 A1 | 10/2009 |
| GB | 113032 | 2/1918 |
| GB | 974042 A | 11/1964 |
| GB | 2084038 A | 4/1982 |
| GB | 2348377 A | 3/1999 |
| IT | MI20091797 A1 | 4/2011 |
| IT | UB20159709 A1 | 6/2017 |
| IT | 102016000028623 | 9/2017 |
| JP | s5380406 A | 7/1978 |
| JP | s56112993 A | 9/1981 |
| JP | s5780488 A | 5/1982 |
| JP | s58104415 A | 6/1983 |
| JP | s58140507 A | 8/1983 |
| JP | s60104190 A | 6/1985 |
| JP | s62138609 A | 6/1987 |
| JP | s6317960 A | 1/1988 |
| JP | 2001248501 A | 9/2001 |
| JP | 2006016495 A | 1/2006 |
| JP | 2007152214 A | 6/2007 |
| JP | 2007277503 A | 10/2007 |
| JP | 2009293819 A | 12/2009 |
| JP | 2011038000 A | 2/2011 |
| JP | 2011046701 A | 3/2011 |
| WO | 198102687 A1 | 10/1981 |
| WO | 199818884 A2 | 5/1998 |
| WO | 2003031540 A1 | 4/2003 |
| WO | 2003033097 A2 | 4/2003 |
| WO | 2004071670 A1 | 8/2004 |
| WO | 2005016499 | 2/2005 |
| WO | 2007083106 A2 | 7/2007 |
| WO | 2008084776 A1 | 7/2008 |
| WO | 2011015844 A1 | 2/2011 |
| WO | 2011021473 A1 | 2/2011 |
| WO | 2011115501 A1 | 9/2011 |
| WO | 2013098630 | 7/2013 |
| WO | 2013124726 A1 | 8/2013 |
| WO | 2014162280 | 10/2014 |
| WO | 2014162281 A2 | 10/2014 |
| WO | 2015150971 | 10/2015 |
| WO | 2015198231 | 12/2015 |
| WO | 2017013071 | 1/2017 |
| WO | 2017013074 | 1/2017 |
| WO | 2017060464 | 4/2017 |

OTHER PUBLICATIONS

International Search Report and Written Opinion for PCT/EP2017/084093 dated Jan. 24, 2018.

* cited by examiner

DEVICE FOR MIXING WATER AND DIESEL OIL, APPARATUS AND PROCESS FOR PRODUCING A WATER/DIESEL OIL MICRO-EMULSION

CROSS REFER TO RELATED APPLICATIONS

This application is a division of U.S. patent application Ser. No. 15/525,735, filed May 10, 2017, which is a national stage application, filed under 35 U.S.C. § 371, of International Patent Application No. PCT/EP2015/074594, filed on Oct. 23, 2015, which claims the benefit of Foreign Patent Application No. ITMI2014A001931, filed Nov. 10, 2014, all of which are incorporated by reference herein in their entirety.

FIELD OF THE INVENTION

The present invention relates to a device for mixing water and diesel oil, to an apparatus and to a process for producing a water/diesel oil micro-emulsion. The present invention refers in particular to the production of water/diesel oil micro-emulsions for internal combustion diesel engines with the aim of reducing the pollutants generated by the combustion.

BACKGROUND OF THE INVENTION

Water/diesel oil emulsions are nowadays known and used in diesel cycle internal combustion engines and in heating burners with the purpose of reducing the presence of harmful pollutants in exhaust gases, such as NOx, SOx, CO and particulate matter (PM).

The practice of adding water to diesel dates back to the early 1900s, and there are hundreds of different patented implementations. Depending on the application, the water content may vary from 8%-35%, with a typical 13% water formulation for diesel engine use. There are numerous benefits to adding water to diesel. Water vaporization increases fuel dispersion in the form of smaller droplets and the contact surface between fuel and air is increased. As a result, combustion is more efficient; combustion temperature peaks are lowered, thereby reducing NOx; and PM formation is reduced.

Document WO 2013/124726 shows an installation and a process for preparing a water/diesel oil emulsion. The installation comprises: a water feeding unit, an activator feeding unit, a diesel oil feeding unit and a pre-mixing tank. A mixing device is placed downstream of said pre-mixing tank and comprises: a tubular duct defining an extension direction, at least one helical channel arranged inside the tubular duct for generating a turbulent flow of the mixture of water, activator and diesel oil inside said tubular element, at least one first baffle comprising a plurality of holes and arranged perpendicularly to said extension direction and downstream of said first helical channel, at least one inlet element comprising a tapered portion at an end thereof and a plurality of holes arranged with an axis of extension substantially parallel to the axis and adapted to let the inlet fluid into the first helical channel. Document EP 0 958 853 discloses a process for producing stable emulsions of at least two substantially immiscible fluids, particularly emulsions of a liquid fuel with water. The fluids to be emulsified are injected into an emulsification chamber provided with an injection system which imparts to the fluids a motion in a direction which is substantially perpendicular to the general direction in which the fluids travel through the emulsification chamber. This injection system is provided by means of a diffuser having an inlet hole, through which a stream of liquid is fed in a substantially axial direction, and at least one outlet hole, which leads into the chamber and whose axis lies on a plane which is substantially perpendicular to the direction of the inlet stream. In this manner, the stream strikes the walls of the emulsification chamber, producing a turbulent fluid motion which has a predominantly helical orientation and is capable of producing a dispersion of one fluid in the other, forming dispersed-phase particles.

In this field, the Applicant has observed that the manufacturing process for emulsion fuels is not straightforward. Indeed, the emulsion fuel cannot be produced simply by putting together water and fossil fuel.

The Applicant further observed that the dispersion of fine water and oil droplets, which are inherently mutually immiscible, is very unstable and goes back to the initial condition of the two-phase mixture over time. This phase separation phenomenon makes it difficult to accurately evaluate combustion efficiency for individual emulsion fuels.

The Applicant further observed that, since the phase separation phenomenon gradually proceeds over time, the combustion efficiency of the particular fuels involved varies depending on the time when the combustion experiment is performed.

The Applicant further observed that, currently, ultrafine emulsion fuel products are available, although there has not been any technology to maintain the products in a stable emulsified state. Emulsifying agents may be added to protect oil and water droplets in order to maintain the emulsified suspension. The development of these agents, however, is still in the fledgling stage and presents several challenges, including the possible effects on combustion.

The Applicant finally observed that the most urgent problem is how phase separation can be avoided to produce optimal emulsions and how the emulsified condition can be stabilized during a longer period.

The Applicant further observed that the process and plants of the prior art, like WO 2013/124726 and EP 0 958 853 cited above, cannot guarantee the stability needed.

The Applicant perceived that an higher level of emulsification can be promoted by recirculating a batch comprising diesel oil, water and an emulsifying composition through a mixing device.

The Applicant has finally found that a mixing device provided with the features claimed and described further on is able to exert on the flowing liquid compression, centrifuging, dispersion and shear forces in order to promote emulsification.

The Applicant verified that this recirculation system allows to increase the emulsification to highest levels.

The Applicant further verified that this recirculation system allows to flexibly select the emulsification level of the batch, in particular adjusting the number of recirculation loops

SUMMARY

In a first aspect, the invention relates to a device for mixing water and diesel oil, comprising:

at least one duct for a flow of liquid, said duct extending along a main direction and presenting an inlet opening and an outlet nozzle;

a cone shaped septum placed in the duct, coaxial with respect to the main direction and tapering towards the outlet nozzle, said cone shaped septum being provided with a plurality of holes made through its conical wall;

a plurality of lamellae arranged in at least a portion of the duct placed downstream of the cone shaped septum, said plurality of lamellae dividing said portion in a plurality of small chambers, wherein said lamellae are provided with through holes;

said holes and said small chambers delimiting a labyrinth passageway for the liquid flowing through the duct towards the outlet nozzle.

In a second aspect, the invention relates to an apparatus for preparing a water/diesel oil micro-emulsion, comprising:

at least one diesel oil feeding unit;
at least one emulsifying composition feeding unit;
at least one water feeding unit;
at least one mixing tank in fluid communication with the diesel oil feeding unit, with the emulsifying composition feeding unit and with the water feeding unit;
the mixing device of the first aspect and/or according to one or more of the following aspects, said mixing device being operatively connected to said mixing tank.

In a third aspect, the invention relates to a process for preparing a water/diesel oil micro-emulsion, comprising:

feeding a predetermined amount of a diesel oil into a mixing tank;
feeding a predetermined amount of an emulsifying composition into the mixing tank;
feeding a predetermined amount of water into the mixing tank;
recirculating the batch in the mixing tank comprising said diesel oil, said emulsifying composition and said water through a recirculation conduit and through a mixing device according to the first aspect and/or according to one or more of the following aspects;
discharging the fuel micro-emulsion batch.

The structure of the mixing device according to the invention makes the flow to be subject to compression, centrifuging, dispersion and shear forces and makes the molecules to impact against the inner walls of the duct, greatly improving emulsification. This actions inside the mixing device are repeated a plurality of times thanks to recirculation and each time the emulsification level is improved.

Please note that, with the terms "Diesel oil" or "Diesel fuel" any liquid fuel used in diesel engines, whose fuel ignition takes place as a result of compression of the inlet air mixture, is meant.

Aspects of the invention are presented below.

In an aspect according to the preceding aspects, the cone shaped septum delimits at the vertex an angle comprised between about 50° and about 70°, preferably of about 60°. In an aspect according to the preceding aspects, a ratio between a length of the cone shaped septum and a diameter of the inlet opening is comprised between about 0.90 and about 1.10, preferably of about 1. In an aspect according to the preceding aspects, the through holes are distributed over all the conical wall of the cone shaped septum. In an aspect according to the preceding aspects, the through holes are distributed in lines and circumferences over the conical wall of the cone shaped septum. In an aspect according to the preceding aspects, the through holes of the cone shaped septum are perpendicular to the conical wall. In an aspect according to the preceding aspects, the through holes of the cone shaped septum delimit with the main direction a vertex angle comprised between about 50° and about 70°, preferably of about 60°. In an aspect according to the preceding aspects, each of the through holes of the cone shaped septum presents a section area comprised between about 0.8 $mm^2$ and about 1.2 $mm^2$, preferably of about 1 $mm^2$.

In an aspect according to the preceding aspects, the ratio between an overall area of all the through holes of the cone shaped septum and a section area at the inlet opening is comprised between about 0.04 and about 0.08, preferably of about 0.06. In an aspect according to the preceding aspects, first lamellae of said plurality are arranged in a first labyrinth section of the duct with constant section area. In an aspect according to the preceding aspects, the first labyrinth section presents a circular cross section. In an aspect according to the preceding aspects, a ratio between the constant section area of the first labyrinth section and an inlet opening section area is comprised between about 0.20 and about 0.30, preferably of about 0.25. In an aspect according to the preceding aspects, a ratio between a length of the first labyrinth section and a diameter at the inlet opening is comprised between about 2.5 and about 3, preferably of about 2.75.

In an aspect according to the preceding aspects, second lamellae of said plurality are arranged in a second labyrinth section of the duct tapering towards the outlet nozzle. In an aspect according to the preceding aspects, the second labyrinth section presents the shape of a truncated cone. In an aspect according to the preceding aspects, the second labyrinth section presents a tapering angle comprised between about 35° and about 45°, preferably of about 40°. In an aspect according to the preceding aspects, a ratio between a length of the second labyrinth section and a diameter at the inlet opening is comprised between about 1.1 and about 1.3, preferably of about 1.2.

In an aspect according to the preceding aspects, at least part of the lamellae forms a honeycomb structure.

In an aspect according to the preceding aspects, the device comprises an inlet septum placed just after the inlet opening and provided with a plurality of through holes. In an aspect according to the preceding aspects, the through holes extends parallel to the main direction. In an aspect according to the preceding aspects, in a frontal view of the inlet septum, the through holes are arranged like blades of a propeller. In an aspect according to the preceding aspects, the blades are two and are disposed on opposite sides with respect to a center defined by the main direction. In an aspect according to the preceding aspects, in a frontal view of the septum, each blade is shaped like a hook. In an aspect according to the preceding aspects, the through holes comprise a plurality of more nested holes defining a border of each blade and a plurality of less nested holes placed inside said border.

In an aspect according to the preceding aspects, each of the through holes of the inlet septum presents a section area comprised between about 1 $mm^2$ and about 2 $mm^2$, preferably of about 1.5 $mm^2$. In an aspect according to the preceding aspects, the ratio between an overall area of all the through holes of the inlet septum and a section area at the inlet opening is comprised between about 0.05 and about 1, preferably of about 0.075.

In an aspect according to the preceding aspects, the device comprises an intermediate septum placed between the inlet septum and the cone shaped septum and provided with a plurality of through holes. In an aspect according to the preceding aspects, the through holes extends parallel to the main direction. In an aspect according to the preceding aspects, in a frontal view of the intermediate septum, the through holes are disposed on a plurality of arched paths developing radially from a center defined by the main direction. In an aspect according to the preceding aspects, in a frontal view of the intermediate septum presents a square shape. In an aspect according to the preceding aspects, each arched path is curved on a opposite sense with respect to the blades of the inlet septum. In an aspect according to the preceding aspects, the through holes comprise larger holes and smaller holes. In an aspect according to the preceding aspects, an arched path with larger holes is placed between two adjacent arched paths with smaller holes and/or an arched path with smaller holes is placed between two adjacent arched paths with larger holes. In an aspect according to the preceding aspects, each of the larger holes of the intermediate septum presents a section area comprised between about 30 mm$^2$ and about 40 mm$^2$, preferably of about 36 mm$^2$. In an aspect according to the preceding aspects, each of the smaller holes of the intermediate septum presents a section area comprised between about 5 mm$^2$ and about 15 mm$^2$, preferably of about 9 mm$^2$. In an aspect according to the preceding aspects, the ratio between an overall area of all the through holes of the intermediate septum and a section area at the inlet opening is comprised between about 0.40 and about 0.45, preferably of about 0.43.

In an aspect according to the preceding aspects, the device further comprises an auxiliary septum placed between the cone shaped septum and the plurality of lamellae and provided with a plurality of through holes. In an aspect according to the preceding aspects, the through holes extends parallel to the main direction. In an aspect according to the preceding aspects, in a frontal view of the inlet septum, the through holes are arranged like blades of a propeller. In an aspect according to the preceding aspects, the blades are four and are disposed two by two on opposite sides with respect to a center defined by the main direction. In an aspect according to the preceding aspects, in a frontal view of the septum, each blade is shaped like a hook. In an aspect according to the preceding aspects, the through holes comprise a plurality of more nested holes defining a border of each blade and a plurality of less nested holes placed inside said border. In an aspect according to the preceding aspects, each of the through holes of the auxiliary septum presents a section area comprised between about 1 mm$^2$ and about 2 mm$^2$, preferably of about 1.5 mm$^2$. In an aspect according to the preceding aspects, the ratio between an overall area of all the through holes of the auxiliary septum and a section area at the inlet opening is comprised between about 0.10 and about 0.20, preferably of about 0.15.

In an aspect according to the preceding aspects, the duct comprises a plurality of divergent sections.

In an aspect according to the preceding aspects, the duct comprises a plurality of convergent sections.

In an aspect according to the preceding aspects, the duct comprises a plurality of sections provided with constant cross section area.

In an aspect according to the preceding aspects, a ratio between a total length of the duct and the diameter of the inlet opening is comprised between about 13 and about 17, preferably of about 15.

In an aspect according to the preceding aspects, the duct comprises a first section delimited between the inlet opening and an inlet septum and provided with a constant section area, wherein a ratio between the constant section area of the first section and an inlet opening section area is about 1. In an aspect according to the preceding aspects, the first section presents a circular cross section. In an aspect according to the preceding aspects, a ratio between a length of the first section and a diameter at the inlet opening is comprised between about 0.7 and about 0.9, preferably of about 0.8.

In an aspect according to the preceding aspects, the duct comprises a second section placed just downstream of the inlet septum and provided with a constant section area, wherein a ratio between the constant section area of the second section and an inlet opening section area is comprised between about 1.5 and between about 2, preferably of about 1.8. In an aspect according to the preceding aspects, the second section presents a circular cross section. In an aspect according to the preceding aspects, a ratio between a length of the second section and a diameter at the inlet opening is comprised between about 0.4 and about 0.6, preferably of about 0.5.

In an aspect according to the preceding aspects, the duct comprises a third section tapering towards the outlet nozzle. In an aspect according to the preceding aspects, the third section presents a tapering angle comprised between about 40° and about 60°, preferably of about 50°. In an aspect according to the preceding aspects, the third section presents the shape of a truncated cone. In an aspect according to the preceding aspects, a ratio between a length of the third section and a diameter at the inlet opening is comprised between about 0.7 and about 1.2, preferably of about 1.

In an aspect according to the preceding aspects, the duct comprises a fourth section placed just downstream of the third section and provided with a constant section area, wherein a ratio between the constant section area of the fourth section and an inlet opening section area is comprised between about 0.25 and between about 0.35, preferably of about 0.3. In an aspect according to the preceding aspects, the fourth section presents a circular cross section. In an aspect according to the preceding aspects, a ratio between a length of the fourth section and a diameter at the inlet opening is comprised between about 0.6 and about 0.7, preferably of about 0.65.

In an aspect according to the preceding aspects, the duct comprises a fifth section placed just downstream of the fourth section and just upstream of the intermediate septum, wherein the fifth section is provided with a constant section area, wherein a ratio between the constant section area of the fifth section and an inlet opening section area is comprised between about 2.5 and between about 3.5, preferably of about 3.1. In an aspect according to the preceding aspects, the fifth section presents a square cross section. In an aspect according to the preceding aspects, a ratio between a length of the fifth section and a diameter at the inlet opening is comprised between about 0.2 and about 0.25, preferably of about 0.23.

In an aspect according to the preceding aspects, the duct comprises a sixth section placed downstream of the intermediate septum and tapering towards the outlet nozzle. In an aspect according to the preceding aspects, the sixth section presents a tapering angle comprised between about 70° and about 90°, preferably of about 80°. In an aspect according to the preceding aspects, a ratio between a length of the sixth section and a diameter at the inlet opening is comprised between about 0.27 and about 0.35, preferably of about 0.33. In an aspect according to the preceding aspects, the sixth section presents the shape of a truncated pyramid.

In an aspect according to the preceding aspects, the duct comprises a seventh section placed downstream of the sixth section and tapering towards the outlet nozzle. In an aspect according to the preceding aspects, the seventh section presents a tapering angle smaller than the tapering angle of the sixth section and preferably comprised between about 30° and about 50°, preferably of about 40°. In an aspect according to the preceding aspects, a ratio between a length of the seventh section and a diameter at the inlet opening is comprised between about 0.65 and about 0.75, preferably of about 0.7. In an aspect according to the preceding aspects, the seventh section presents the shape of a truncated pyramid.

In an aspect according to the preceding aspects, the duct comprises an eighth section placed downstream of the seventh section and diverging towards the outlet nozzle. In an aspect according to the preceding aspects, the eighth section presents a diverging angle comprised between about 60° and about 80°, preferably of about 70°. In an aspect according to the preceding aspects, a ratio between a length of the eighth section and a diameter at the inlet opening is comprised between about 0.55 and about 0.65, preferably of about 0.62. The eighth section opens into the conical volume delimited by the cone shaped septum.

In an aspect according to the preceding aspects, the duct comprises a ninth section placed downstream of the eighth section and just upstream of the auxiliary septum. The cone shaped septum axially protrudes into said ninth section. The ninth section tapers towards the outlet nozzle. In an aspect according to the preceding aspects, the ninth section presents a tapering angle comprised between about 10° and about 20°, preferably of about 15°. In an aspect according to the preceding aspects, a ratio between a length of the ninth section and a diameter at the inlet opening is comprised between about 3.4 and about 3.8, preferably of about 3.6. In an aspect according to the preceding aspects, the ninth section presents the shape of a truncated cone.

In an aspect according to the preceding aspects, the duct comprises a tenth section placed just downstream of the auxiliary septum, wherein the tenth section is provided with a constant section area, wherein a ratio between the constant section area of the tenth section and an inlet opening section area is comprised between about 0.9 and between about 1.1, preferably of about 1. In an aspect according to the preceding aspects, a ratio between a length of the tenth section and a diameter at the inlet opening is comprised between about 0.75 and about 0.85, preferably of about 0.80. In an aspect according to the preceding aspects, the tenth section presents a circular cross section.

In an aspect according to the preceding aspects, the duct comprises a eleventh section placed just downstream of the tenth section, wherein the eleventh section is provided with a constant section area, wherein a ratio between the constant section area of the eleventh section and an inlet opening section area is comprised between about 2.7 and between about 3.1, preferably of about 2.9. In an aspect according to the preceding aspects, a ratio between a length of the eleventh section and a diameter at the inlet opening is comprised between about 0.6 and about 0.7, preferably of about 0.65. In an aspect according to the preceding aspects, the eleventh section presents a circular cross section.

In an aspect according to the preceding aspects, the duct comprises a twelfth section placed downstream of the eleventh section and tapering towards the outlet nozzle. In an aspect according to the preceding aspects, the twelfth section presents a tapering angle comprised between about 70° and about 90°, preferably of about 80°. In an aspect according to the preceding aspects, a ratio between a length of the twelfth section and a diameter at the inlet opening is comprised between about 0.65 and about 0.75, preferably of about 0.7. In an aspect according to the preceding aspects, the twelfth section presents the shape of a truncated cone.

In an aspect according to the preceding aspects, a ratio between the constant section area A on of the outlet nozzle 41 and an inlet opening section area Ain is comprised between about 0.0035 and of about 0.0050, preferably of about 0.0042.

In an aspect according to the preceding aspects, a ratio between a length Lon of the outlet nozzle 41 and a diameter Din at the inlet opening 40 is comprised between about 0.16 and of about 0.22, preferably of about 0.19.

In an aspect according to the preceding aspects, the diameter at the inlet opening is comprised between about 55 mm and about 70 mm preferably of about 64 mm (about 2.5 inches).

In an aspect according to the preceding aspects, the apparatus comprises a recirculation conduit presenting opposite ends connected to the mixing tank, wherein the mixing device is placed in said recirculation conduit. In an aspect according to the preceding aspects, the recirculation conduit presents at least a first end connected to an upper portion of the mixing tank and a second end connected to a bottom portion of the mixing tank.

In an aspect according to the preceding aspects, the apparatus comprises a first conduit connected to the diesel oil feeding unit and opening into the mixing tank, preferably into an upper portion of said mixing tank. In an aspect according to the preceding aspects, the diesel oil feeding unit comprises a diesel oil tank.

In an aspect according to the preceding aspects, the apparatus comprises a second conduit connected to the emulsifying composition feeding unit and in fluid communication with the mixing tank. In an aspect according to the preceding aspects, the second conduit is connected to the first conduit upstream of the mixing tank. In an aspect according to the preceding aspects, the emulsifying composition feeding unit comprises an emulsifying composition tank.

In an aspect according to the preceding aspects, the apparatus comprises a third conduit connected to the water feeding unit and opening into the mixing tank, preferably into an upper portion of the mixing tank. In an aspect according to the preceding aspects, an end of the third conduit placed in the mixing tank comprises a nozzle head with a plurality of nozzles to spray the water in the mixing tank. In an aspect according to the preceding aspects, the water feeding unit comprises a demineralization unit. In an aspect according to the preceding aspects, the water feeding unit comprises a water tank.

In an aspect according to the preceding aspects, the mixing device is placed in a portion of the first conduit in common with the recirculation conduit. In an aspect according to the preceding aspects, the mixing device is placed downstream of the connection of the second conduit to the first conduit. In an aspect according to the preceding aspects, the recirculation conduit comprises a bypass conduit connecting a junction point of said recirculation conduit placed just upstream of the mixing device to an upper portion of the mixing tank.

In an aspect according to the preceding aspects, the apparatus comprises a reservoir in fluid communication with a bottom portion of the mixing tank and with the recirculation conduit. In an aspect according to the preceding aspects, the apparatus comprises a discharge conduit presenting a first end connected to the bottom portion of the mixing tank and/or to the reservoir.

In an aspect according to the preceding aspects, the apparatus further comprises at least one auxiliary mixing device according to the previous aspects placed in the first conduit and/or in the second conduit and/or in the third conduit.

In an aspect according to the preceding aspects, the process for preparing a water/diesel oil micro-emulsion comprises: filling the mixing tank with the diesel oil, the emulsifying composition and the water before starting recirculation.

In an aspect according to the preceding aspects, the process for preparing a water/diesel oil micro-emulsion comprises: adding the emulsifying composition to the diesel oil before introducing them into the mixing tank. In an aspect according to the preceding aspects, adding the emulsifying composition to the diesel oil comprises: merging the flow of emulsifying composition into the flow of the diesel oil upstream of the mixing tank. In an aspect according to the preceding aspects, the emulsifying composition and the diesel oil are fed to the mixing tank through the mixing device. In an aspect according to the preceding aspects, the emulsifying composition and the diesel oil are fed to the mixing device after merging.

In an aspect according to the preceding aspects, the predetermined amount of diesel oil may be comprised between about 3500 liters and about 3700 liters, preferably of about 3600 liters. In an aspect according to the preceding aspects, the flow rate of diesel oil flowing through the first conduit may be comprised between about 9.7 L/s (liters per second) and about 10.5 L/s, preferably of about 10 L/s.

In an aspect according to the preceding aspects, the diesel oil may be any hydrocarbon admixture including paraffins, aliphatic hydrocarbons and cyclic hydrocarbons, derived from fractional distillation of petroleum (petroldiesel). Generally, diesel oils have boiling points ranging from about 170° C. to about 390° C.

In alternative, synthetic diesel not derived from petroleum such as biodiesel, biomass to liquid (BTL), gas to liquid (GTL) and Coal To Liquid (CTL) may be used.

In an aspect according to the preceding aspects, the predetermined amount of emulsifying composition may be comprised between about 34.80 liters and about 36.10 liters, preferably of about 35.40 liters. In an aspect according to the preceding aspects, the flow rate of emulsifying composition flowing through the second conduit may be comprised between about 0.097 L/s and about 0.100 L/s, preferably of about 0.098 L/s.

In an aspect according to the preceding aspects, the emulsifying composition comprises at least:
1) from 20.0 to 33.0% by weight of at least a non-ionic polymer selected among polyglycerides of mono-, di- and tri-glycerides of fatty acids, polyethylene glycols, polyvinyl alcohols, polyvinylpyrrolydone (PVP), vinylpyrrolidone (VP)/vinyl acetate (VA) copolymers, vinyl methacrylate (VMA)/acrylamide (AM) copolymers, ethyl-, ethylmethyl-, ethylhydroxy-, hydroxyl-, methyl-, hydroxypropyl-cellulose, natural gums—such as karaya gum, tragacanth gum, carob bean gum—and admixtures thereof;
2) from 6.0 to 10.0% by weight of at least a lipophilic non-ionic surfactant, having HLB lower than 7;
3) from 16.0 to 29.0% by weight of at least a hydrophilic non-ionic surfactant having HLB higher than 10;
4) from 6.5 to 11.5% by weight of at least an anionic surfactant selected among sulfates, sulfonates, phosphates and carboxylates salts;
5) from 9.5 to 16.5% by weight of at least an amphoteric surfactant.

In an aspect according to the preceding aspect, the emulsifying composition further comprises one or more of the following additives:
6) a lubricant;
7) an octane booster;
8) an anti-freezing agent;
9) a stabilizer;
10) an antifoam agent;
11) an adjuvant agent.

In an aspect according to the preceding aspects, the water is fed into the mixing tank after the emulsifying composition and the diesel oil. In an aspect according to the preceding aspects, the water is sprayed like rain from above into the emulsifying composition and the diesel oil.

In an aspect according to the preceding aspects, the predetermined amount of water may be comprised between about 1300 liters and about 1400 liters, preferably of about 1350 liters. In an aspect according to the preceding aspects, the flow rate of water flowing through the third conduit may be comprised between about 7.2 L/s and about 7.8 L/s, preferably of about 7.5 L/s.

In an aspect according to the preceding aspects, water can be any type of purified water such as distilled, deionized or demineralized water, preferably is a demineralized water.

In an aspect according to the preceding aspects, the pressure of the water entering the mixing tank 5 may be comprised between about 10 bar and about 15 bar, preferably of about 12 bar.

In an aspect according to the preceding aspects, the overall batch comprising the diesel oil, the emulsifying composition and the water may be comprised between about 4800 liters and about 5200 liters, preferably of about 5000 liters.

In an aspect according to the preceding aspects, the percentage by weight of diesel oil, emulsifying composition and water of the batch in the mixing tank 5 may be as follows:
diesel oil comprised between about 95% and about 70% by weight;
emulsifying composition of at most 2.0% by weight, preferably comprised between about 0.5% and about 3.0% by weight;
demi-water comprised between about 5% and about 30% by weight.

The percentages by weight of are referred to the overall weight of the final microemulsion.

In an aspect according to the preceding aspects, recirculation through the mixing device is performed for a number of times comprised between about 7 and between about 11, preferably of about 9.

In an aspect according to the preceding aspects, the flow rate entering the mixing device during this recirculation through the mixing device may be comprised between about 70.00 L/s and about 90.00 L/s, preferably of about 80.00 L/s. The pressure of fluid entering the mixing device may be comprised between about 100 bar and about 140 bar, preferably of about 120 bar. The time required for performing this recirculation may be comprised between about 8 min and about 15 min, preferably of about 10 min.

In an aspect according to the preceding aspects, at least during the last recirculation loop, the batch is passed through the bypass conduit. In an aspect according to the preceding aspects, the flow rate of the batch flowing through the recirculation conduit and the bypass conduit may be comprised between about 2 L/s and about 4 L/s, preferably of about 3 L/s. In an aspect according to the preceding aspects, the pressure of fluid through the recirculation conduit and the bypass conduit may be comprised between about 1 bar and about 4 bar, preferably of about of about 2 bar.

In an aspect according to the preceding aspects, the time required for performing this last recirculation may be comprised between about 20 min and about 50 min, preferably of about 35 min.

In an aspect according to the preceding aspects, the water is heated before reaching the mixing tank, preferably at a temperature comprised between about 20° C. and about 24° C. In an aspect according to the preceding aspects, the emulsifying composition is heated before reaching the mixing tank, preferably at a temperature comprised between about 20° C. and about 24° C.

Further characteristics and advantages will be clear from the detailed description of a preferred but not exclusive embodiment of an apparatus and a process for producing a water/diesel oil micro-emulsion in accordance with the present invention.

DESCRIPTION OF DRAWINGS

Such description will be set forth hereinbelow with reference to the set of drawings, provided merely as a non-limiting example, in which.

DETAILED DESCRIPTION

Figure 1:
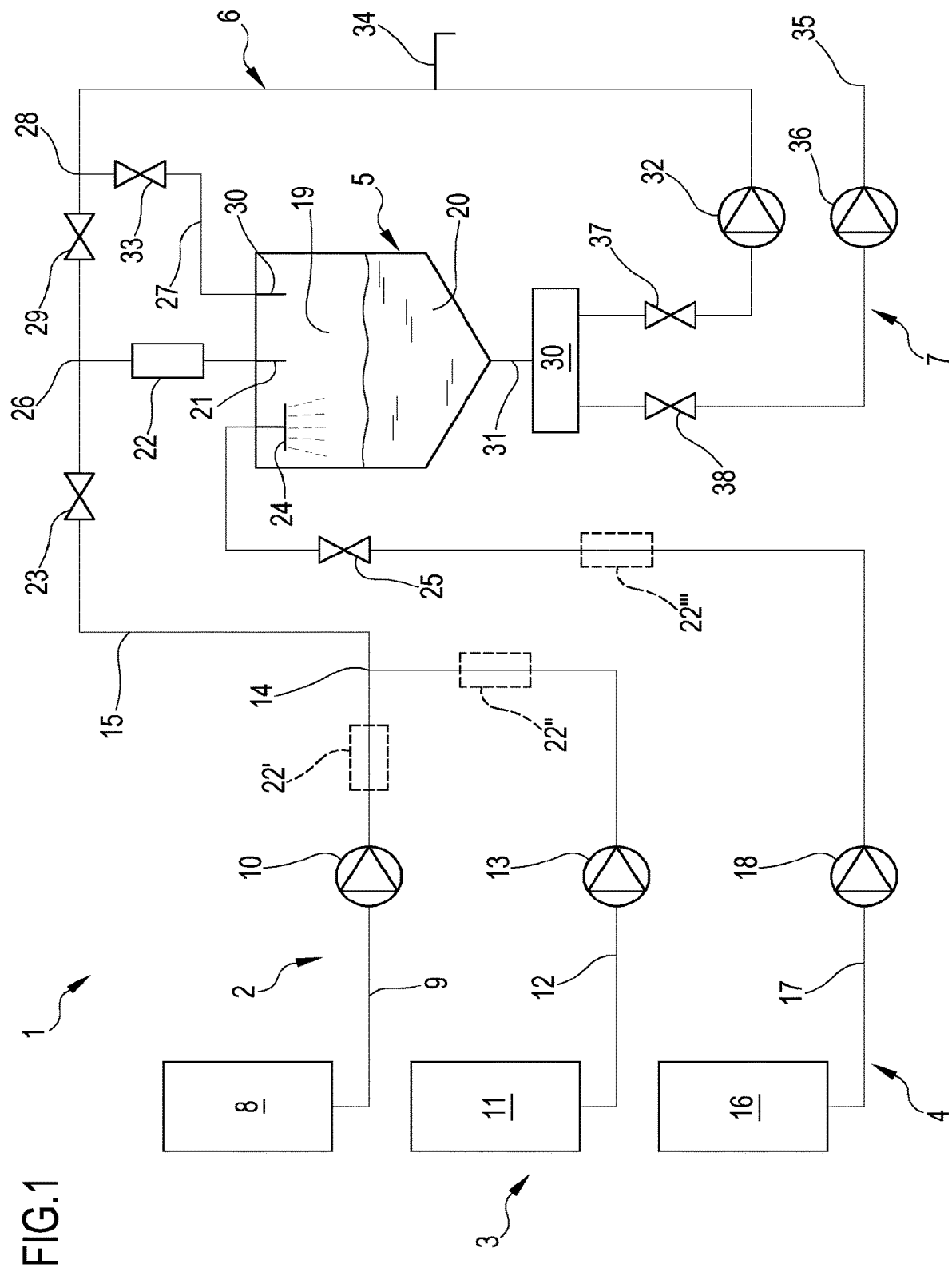
FIG. 1 is a schematic view of the apparatus for preparing a water/diesel oil micro-emulsion according to the invention.

Referring to the attached schematic FIG. 1, the apparatus for preparing a water/diesel oil micro-emulsion is identified by reference numeral 1. The apparatus 1 comprises a diesel oil feeding unit 2, an emulsifying composition feeding unit 3, a water feeding unit 4 and a mixing tank 5 provided with a recirculation conduit 6 and a discharge duct 7.

The diesel oil feeding unit 2 comprises a diesel oil tank 8, a first conduit 9 presenting a first end connected to the diesel oil tank 8 and a second end connected to the mixing tank 5. A first pump 10 is placed in the first conduit to pump the diesel oil from the respective tank 8 towards the mixing tank 5.

The emulsifying composition feeding unit 3 comprises an emulsifying composition tank 11, a second conduit 12 presenting a first end connected to the emulsifying composition tank 11 and a second end connected to the mixing tank 5. A second pump 13 is placed in the second conduit 12 to pump the emulsifying composition from the respective tank 11 towards the mixing tank 5. Heating elements, not shown, are operatively connected to the emulsifying composition tank 11 and/or to the second conduit 12 to heat the emulsifying composition.

As shown in FIG. 1, the second conduit 12 is connected to the first conduit 9 at a connection point 14 positioned downstream of the first and second pumps 10, 13 and upstream of the mixing tank 5. Downstream of the connection point 14, a common conduit 15 is present through which the diesel oil and the emulsifying composition flow.

The water feeding unit 4 comprises a water tank 16, a third conduit 17 presenting a first end connected to the water tank 16 and a second end connected to the mixing tank 5. A third pump 18 is placed in the third conduit 17 to pump the water from the respective tank 16 towards the mixing tank 5. The water feeding unit 4 further comprises a demineralization unit, per se known and not shown, in order to send demi-water to the mixing tank 5. Heating elements, not shown, are operatively connected to the water tank 16 and/or to the third conduit 17 to heat the water.

The mixing tank 5 presents an upper portion 19 and a bottom portion 20 shaped like an hopper.

The common conduit 15 enters through an upper wall of the mixing tank 5 and a terminal end 21 of said common conduit 15 is located in the upper portion 19. In said common conduit 15, just before the mixing tank 5, a mixing device 22 is installed, the function and structure of which will be detailed further on. A first valve 23 is placed in the common conduit 15 between the connection point 14 and the mixing device 22.

The third conduit 17 enters through said upper wall of the mixing tank 5 and a second end 24 of said third conduit 17 is located in the upper portion 19. The second end 24 of the third conduit 17 is shaped like a nozzle head with a plurality of nozzles to spray the water in the mixing tank 5. A second valve 25 is placed in the third conduit 17 between the third pump 18 and the respective second end 24.

The recirculation conduit 6 presents a first end connected to the upper portion 19 of the mixing tank 5 and a second end connected to a bottom portion 20 of said mixing tank 5.

In particular, the first end of the recirculation conduit 6 is the terminal end 21 of the common conduit 15 disclosed above. Indeed, as shown in FIG. 1, the recirculation conduit 6 is connected to the common conduit 15 at a joint 26 positioned between the first valve 23 and the mixing device 22. In this way, the mixing device 22 is located also in the recirculation conduit 6. The recirculation conduit 6 further comprises a bypass conduit 27 connecting a junction point 28 of said recirculation conduit 6 placed just upstream of the mixing device 22 to the upper portion 19 of the mixing tank 5. A third valve 29 is placed in the recirculation conduit 6 between the joint 26 and the junction point 28. The bypass conduit 27 enters through the upper wall of the mixing tank 5 and a terminal end 30 of the bypass conduit 27 opens into the upper portion 19.

The second end of the recirculation conduit 6 is connected to a reservoir 30 placed under the mixing tank 5 and the reservoir 30 is in fluid communication with the bottom portion 20 of the mixing tank 5 through an outlet duct 31. A fourth pump 32 is placed in the recirculation conduit 6, close to the reservoir 30. A fourth valve 33 is placed in the bypass conduit 27. A discharge tap 34 is mounted to the recirculation conduit 6 between the fourth pump 32 and the junction point 28.

The discharge conduit 7 presents a first end connected to the bottom portion 20 of the mixing tank 5 and/or to the reservoir 30 and a terminal end 35. In the schematic embodiment of FIG. 1, the first end of the discharge conduit 7 is connected to the reservoir 30 at a point different from the point of connection of the second end of the recirculation conduit 6. A fifth pump 36 is placed in the discharge conduit 7 to pump the fuel micro-emulsion out of the apparatus 1.

A fifth valve 37 is placed in the recirculation conduit 6 between the reservoir 30 and the fourth pump 32 and a sixth valve 38 is placed in the discharge conduit 7 between the reservoir 30 and the fifth pump 36. In the schematic embodiment of FIG. 1, both the fifth and sixth valves 37, 38 are placed close to the reservoir 30.

The mixing device 22 according to the invention is shown in FIGS. 2 to 7. The mixing device 22 is shaped like a cylindrical body which internally delimits a duct 39 extending along a main direction matching with a main axis "X-X" of said cylindrical body. The duct 39 presents an inlet opening 40 connected to a pipe section of the common conduit 15 coming from the joint 26 and an outlet nozzle 41 connected to a pipe section of said common conduit 15 provided with the terminal end 21.

Figure 2:
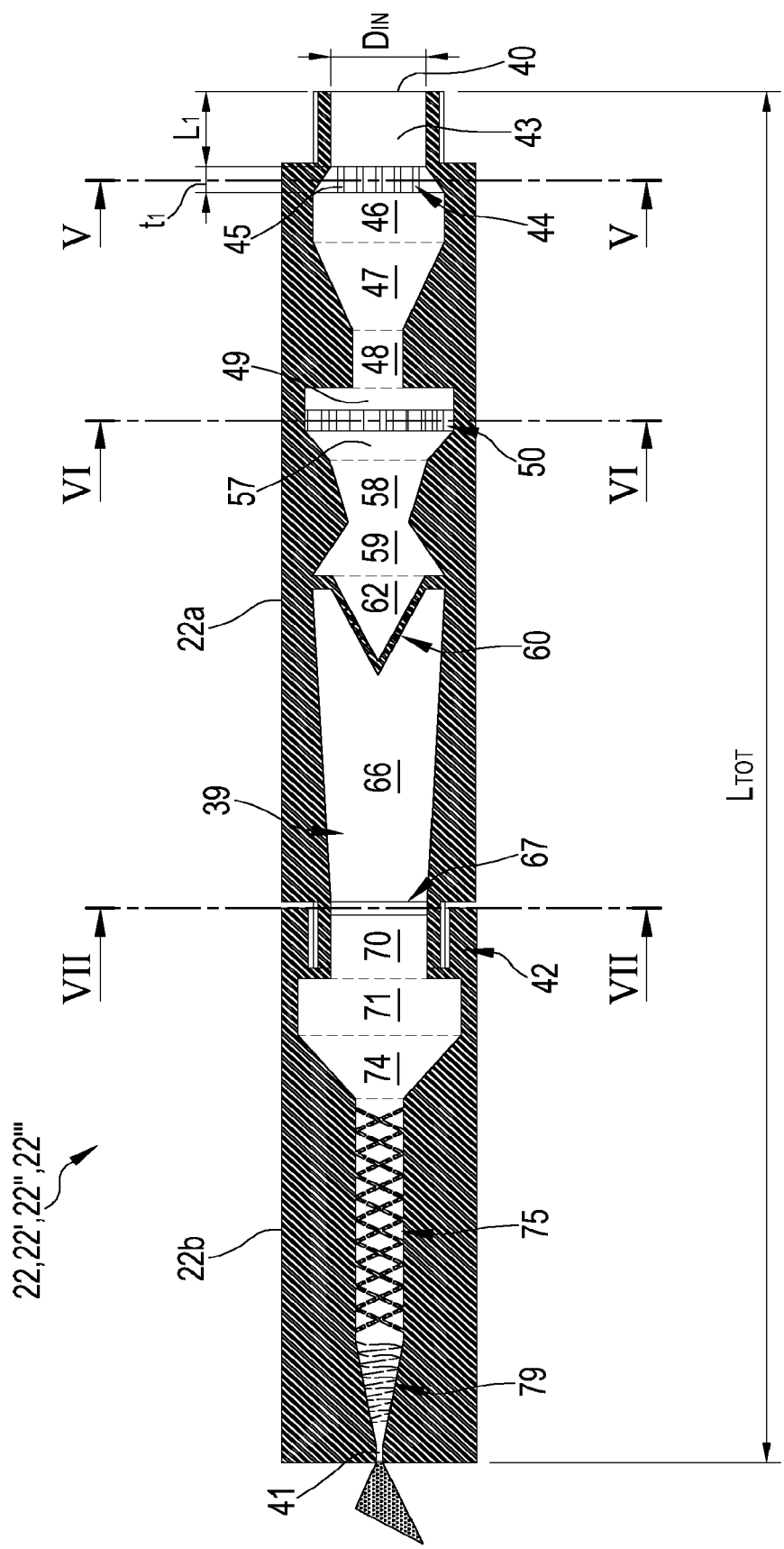
FIG. 2 is a sectional view of a mixing device according to the invention belonging to the apparatus of FIG. 1.
Figure 3:
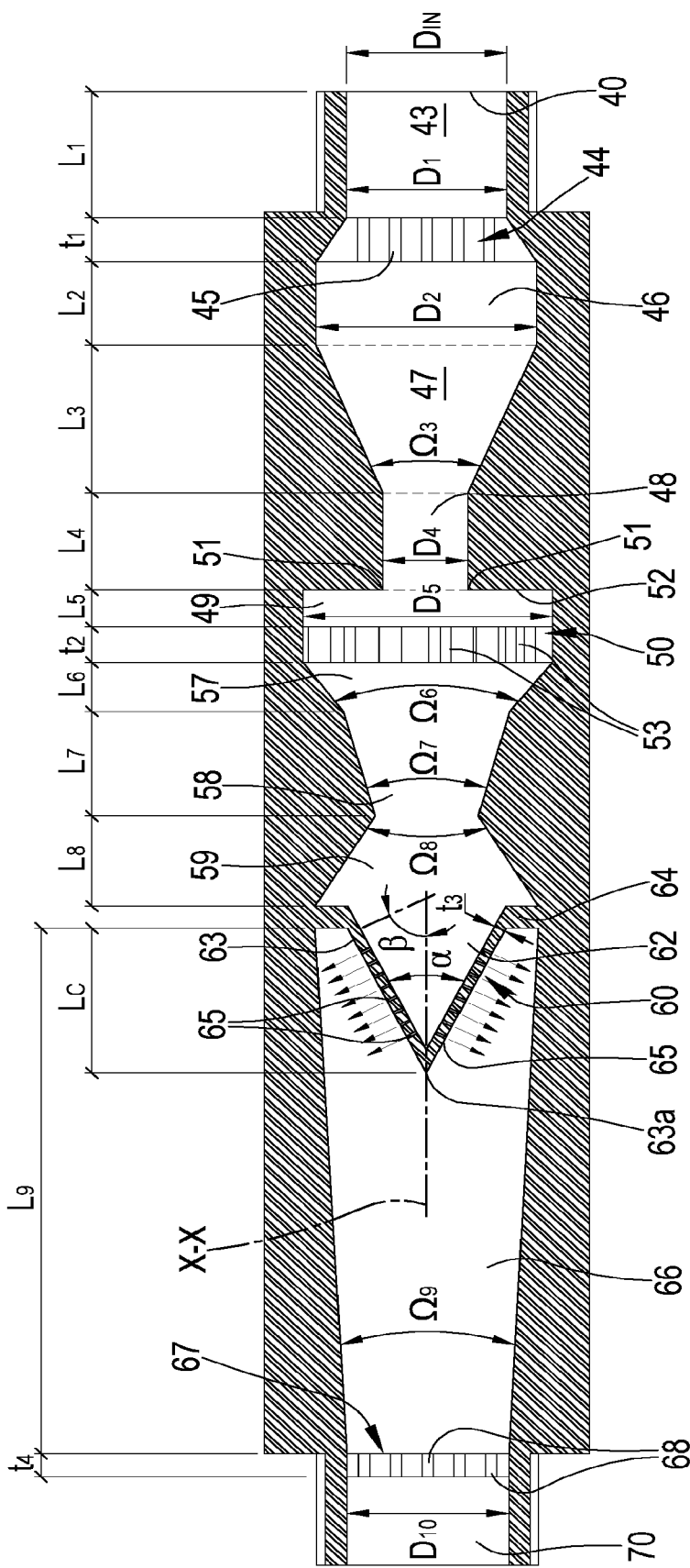
FIG. 3 is an enlarged view of a first part of the mixing device of FIG. 2.
Figure 4:
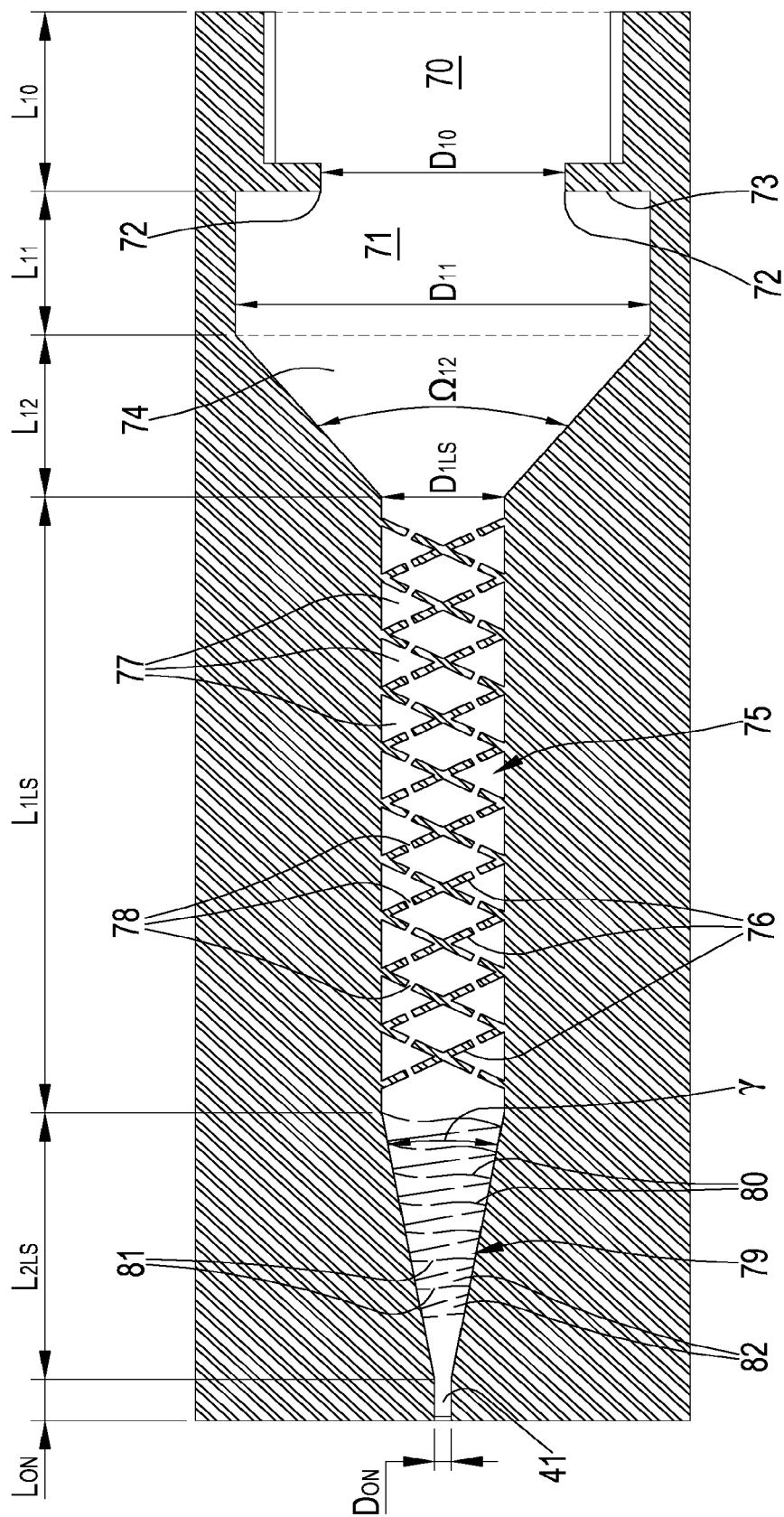
FIG. 4 is an enlarged view of a second part of the mixing device of FIG. 2.

As shown in FIGS. 2 to 4, the cylindrical body of the mixing device 22 is made of a first axial portion 22a (FIG. 3) presenting the inlet opening 40 and a second axial portion 22b presenting the outlet nozzle 41. The first and second portions 22a, 22b are connected (screwed) together at an intermediate zone 42 of the cylindrical body.

The inlet opening 40 presents a circular cross section and the diameter Din of the inlet opening 40 is of about 64 mm. The cross section area Ain of the inlet opening 40 is of about 3.215 mm². A ratio between a total length L tot of the duct 39 and the diameter Din of the inlet opening 40 is of about 15. Said total length L tot is therefore of about 960 mm.

The duct 39 is formed by a plurality of duct sections reciprocally aligned along the main direction "X-X". Said plurality of sections comprises divergent sections, convergent sections and sections provided with constant cross section areas.

The duct 39 comprises a first section 43 delimited between the inlet opening 40 and an inlet septum 44. The first section 43 presents a circular cross section area A1 equal to the cross section area Ain of the inlet opening 40 (diameter D1 equal to Din) and a length L1 of about 50 mm. A ratio between the length L1 of the first section 43 and the diameter Din at the inlet opening 40 is of about 0.8.

Figure 5:
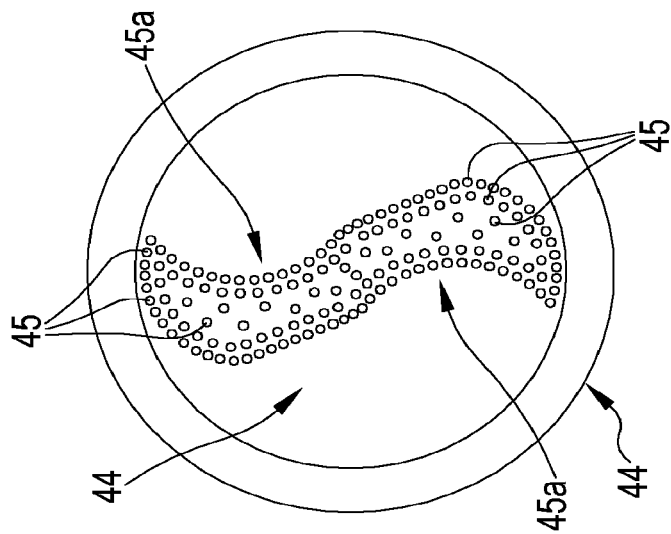
FIG. 5 shows section V-V of the mixing device of FIG. 2.

As recited above, the first section 43 is delimited by the first inlet septum 44 which is a wall extending perpendicular to the main direction "X-X". The inlet septum 44 is circular and closes said duct 39 apart from a plurality of through holes 45 extending parallel to the main direction "X-X" and passing from a face to the opposite one of the inlet septum 44. The through holes 45 are arranged on the inlet septum as shown in FIG. 5. The through holes 45 outline on the inlet septum 44 the shape of two blades 45a of a propeller which are disposed on opposite sides with respect to a center defined by the main direction "X-X". Each blade is shaped like a hook. Each blade/hook is delimited by a plurality of more nested holes defining a border of each blade/hook and by a plurality of less nested holes placed inside said border. Each of the through holes 45 of the inlet septum 44 presents a section area of about 1.5 mm² and the overall are of said through holes 45 is of about 240 mm². The ratio between said overall area of all the through holes 45 of the inlet septum 44 and a section area at the inlet opening 40 is of about 0.075. The thickness t1 of the inlet septum 44 is of about 19 mm.

Just downstream of the inlet septum 44, the duct 39 comprises a second section 46 provided with a circular cross section and a constant section area A2 larger than the inlet section area A1 of the first section 43. The diameter D2 of the second section 46 is of about 88 mm. The section area A2 of the second section 46 is of about 6.080 mm². A ratio between the section area A2 of the second section 46 and an inlet opening section area Ain is of about 1.8. The second section 46 presents a length L2 of about 35 mm. A ratio between the length L2 of the second section 46 and the diameter Din at the inlet opening 40 is of about 0.5. The arrangement of the through holes 45 of the inlet septum 44 impart to the stream of molecules flowing through them into the second section 46 an helical motion winding clockwise.

The duct 39 comprises a third section 47 tapering towards the outlet nozzle 41 and departing just after the second section 46. The third section 47 presents the shape of a truncated cone, the larger base of which has an area equal to the section area A2 of the second section 46. The third section 47 presents a tapering angle Ω3 (delimited by two opposite converging walls) of about 50° and a length L3 of about 65 mm. A ratio between the length L3 of the third section 47 and the diameter Din at the inlet opening 40 is of about 1.

A fourth section 48 is placed just downstream of the third section 47 and is provided with a circular cross section and a constant section area A4. The diameter D4 of the fourth section 48 is of about 33 mm. The section area A4 of the fourth section 48 is equal to the area of the smaller base of the truncated cone of the third section 47. The section area A4 of the fourth section 48 is of about 865 mm². A ratio between the constant section area A4 of the fourth section 48 and an inlet opening section area A in is of about 0.3. The fourth section 48 presents a length L4 of about 42 mm. A ratio between the length L4 of the fourth section 48 and the diameter Din at the inlet opening 40 is of about 0.65.

The duct 39 comprises a fifth section 49 placed just downstream of the fourth section 48 and just upstream of an intermediate septum 50. The fifth section 49 is provided with a square cross section and a constant section area A5. The side D5 of the fifth section 49 is of about 100 mm. The section area A5 of the fifth section 49 is larger than the section area A4 of the fourth section 48. In other words, the fourth section 48 opens suddenly into the fifth section 49 and the passage between said two sections 48, 49 is delimited by a sharp circular edge 51 and by a wall 52 perpendicular to the main direction "X-X" and facing the intermediate septum 50. The section area A5 of the fifth section 49 is of about 10.000 mm². A ratio between the constant section area A5 of the fifth section 49 and an inlet opening section area A in is of about 3.1. The fifth section 49 presents a length L5 of about 16 mm. A ratio between the length L5 of the fifth section 49 and the diameter Din at the inlet opening 40 is of about 0.23.

Figure 6:
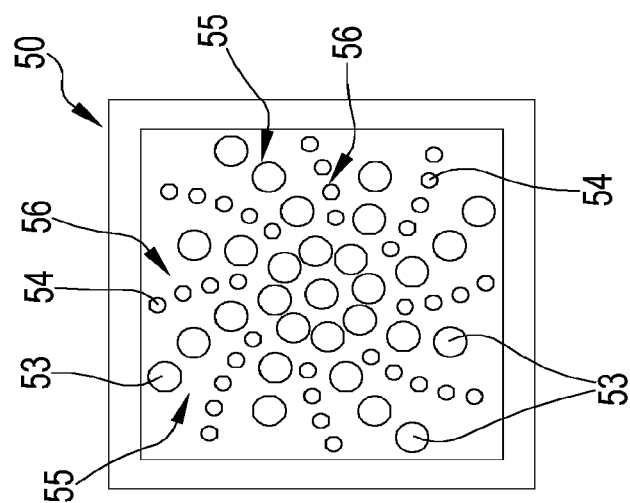
FIG. 6 shows section VI-VI of the mixing device of FIG. 2.

As recited above, the fifth section 49 is delimited by the intermediate septum 50 which is a wall extending perpendicular to the main direction "X-X". The intermediate septum 50 is square and closes said duct 39 apart from a plurality of through holes 53 extending parallel to the main direction "X-X" and passing from a face to the opposite one of the intermediate septum 50. The through holes 53 are arranged on the inlet septum as shown in FIG. 6. The through holes 53, 54 outline on the intermediate septum 50 the shape of a plurality of arched paths developing radially from a center defined by the main direction "X-X". The through holes comprise larger holes 53 and smaller holes 54. First arched paths 55 are formed by larger holes 53 and second arched paths 56 are formed by smaller holes 54. Each first arched path 55 is placed between two adjacent second arched paths 56 and/or each second arched path 56 is placed between two adjacent first arched paths 55. Each of the larger through holes 53 of the intermediate septum 50 presents a section area of about 36 mm² and the overall are of said larger through holes 53 is of about 1050 mm². Each of the smaller through holes 54 of the intermediate septum 50 presents a section area of about 9 mm² and the overall are of said smaller through holes 53 is of about 325 mm². The ratio between the overall area of all the through holes 53, 54 (smaller and larger) of the intermediate septum 50 and a section area at the inlet opening 40 is of about 0.43. The thickness t2 of the intermediate septum 50 is of about 15 mm. Each arched path 55, 56 is curved on an opposite sense with respect to the blades 45a of the inlet septum 44 (counterclockwise).

Just downstream of the intermediate septum 50, the duct 39 comprises a sixth section 57 tapering towards the outlet nozzle 41. The sixth section 57 presents the shape of a truncated pyramid, the larger base of which has an area equal to the section area A5 of the fifth section 49. The sixth section 57 presents a tapering angle Ω6 of about 80° and a length L6 of about 21 mm. A ratio between the length L6 of the sixth section 57 and the diameter Din at the inlet opening 40 is of about 0.33.

A seventh section 58 placed downstream of the sixth section 57 tapers towards the outlet nozzle 41. The seventh section 58 presents the shape of a truncated pyramid too, the larger base of which has an area equal to the section area of the smaller base of the sixth section 57. The seventh section 58 presents a tapering angle Ω7 of about 40° and a length L7 of about 45 mm. A ratio between the length L7 of the seventh section 58 and the diameter Din at the inlet opening 40 is of about 0.7.

Downstream of the seventh section 58 the conduit 39 diverges towards the outlet nozzle 41 in an eighth section 59. The eighth section 59 presents the shape of a truncated pyramid too which diverges towards the outlet nozzle 41. The smaller base of the eighth section has an area equal to the section area of the smaller base of the seventh section 58. The eighth section 59 presents a diverging angle Ω8 of about 70° and a length L8 of about 40 mm. A ratio between the length L8 of the eighth section 59 and the diameter Din at the inlet opening 40 is of about 0.62.

Just downstream of the eighth section 59, the duct 39 is partially closed by a cone shaped septum 60 coaxial with respect to the main direction "X-X". The cone shaped septum 60 tapers towards the outlet nozzle 41 and comprises a conical wall 61 delimiting a conical volume 62 opening towards the eighth section 59. The eighth section 59 opens into the conical volume 62 delimited by the cone shaped septum 60. The conical wall 63 presents a thickness t3 of about 5 mm. A vertex 63a of the cone shaped septum 60 faces the outlet nozzle 41 and presents a vertex angle α of about 60°. The cone shaped septum 60 protrudes from a peripheral wall 64 perpendicular to the main direction "X-X" and surrounding a base of the conical volume 62. Said base of the conical volume 62 presents an area smaller than the section area of the larger base of the eighth section 59. The cone shaped septum 60 presents an axial length Lc of about 65 mm. Said length Lc is measured from the surface of the peripheral wall 64 facing the outlet nozzle 41 to the vertex 63a. A ratio between the length Lc of the cone shaped septum 60 and the diameter Din of the inlet opening 40 is of about 1. The cone shaped septum 60 is provided with a plurality of though holes 65 made through its conical wall 63 and perpendicular to said conical wall 63. The though holes 65 delimit with the main direction "X-X" an angle β of about 60°. Each of the through holes 65 of the cone shaped septum 60 presents a section area of about 1 mm². The through holes 65 are distributed over all the conical wall 63. The overall area of all the through holes 65 of the cone shaped septum 60 is of about 200 mm². A ratio between an overall area of all the through holes 65 of the cone shaped septum 60 and a section area Ain at the inlet opening 40 is of about 0.06.

The cone shaped septum 60 protrudes into a ninth section 66 placed downstream of the eighth section 59. The ninth section 66 presents a circular cross section and tapers towards the outlet nozzle 41. The ninth section 66 presents the shape of a truncated cone, the larger base of which has an area equal to the section area of the larger base of the eighth section 59. The ninth section 66 presents a tapering angle Ω9 of about 15° and a length L9 of about 230 mm. A ratio between the length L9 of the ninth section 66 and the diameter Din at the inlet opening 40 is of about 3.6.

Figure 7:
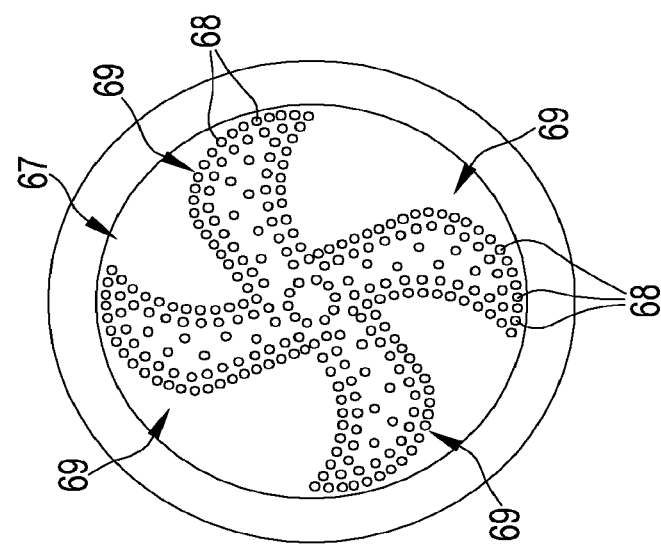
FIG. 7 shows section VII-VII of the mixing device of FIG. 2.

Just downstream of the ninth section 66, the duct 39 is partially closed by an auxiliary septum 67. The auxiliary septum 67 presents a circular cross section, is perpendicular to the main direction "X-X" and is provided with a plurality of through holes 68 extending parallel to the main direction "X-X". The auxiliary septum 67 presents a thickness t4 of about 9 mm. The through holes 68 are arranged on the inlet septum as shown in FIG. 7. The through holes 68 outline on the auxiliary septum 67 the shape of four blades 69 of a propeller which are disposed two by two on opposite sides with respect to a center defined by the main direction "X-X". Each blade 69 is shaped like a hook. Each blade/hook 69 is delimited by a plurality of more nested holes defining a border of each blade/hook and by a plurality of less nested holes placed inside said border. Each of the through holes 68 of the auxiliary septum 67 presents a section area of about 1.5 mm² and the overall are of said through holes 68 is of about 480 mm². The ratio between said overall area of all the through holes 68 of the auxiliary septum 67 and a section area at the inlet opening 40 is of about 0.15.

The duct 39 comprises a tenth section 70 placed just downstream of the auxiliary septum 67. The tenth section 70 is provided with a circular cross section and a constant section area A10 equal to the area of the smaller base of the ninth section 66. The diameter D10 of the tenth section 70 is of about 64 mm. The section area A10 of the tenth section 70 is of about 3.215 mm². A ratio between the constant section area A10 of the tenth section 70 and an inlet opening section area Ain is of about 1. The length L10 of the tenth section 70 is of about 52 mm. A ratio between a length L10 of the tenth section 70 and a diameter Din at the inlet opening 40 is of about 0.80.

An eleventh section 71 is placed just downstream of the tenth section 70. The eleventh section 71 is provided with a circular cross section and a constant section area A11. The diameter D11 of the eleventh section 71 is of about 110 mm. The section area A11 of the eleventh section 71 is of about 9.500 mm². The section area A11 of the eleventh section 71 is larger than the section area A10 of the tenth section 70. In other words, the tenth section 70 opens suddenly into the eleventh section 71 and the passage between said two sections 70, 71 is delimited by a sharp circular edge 72 and by a wall 73 perpendicular to the main direction "X-X" and facing the nozzle outlet 41. A ratio between the constant section area A11 of the eleventh section 71 and an inlet opening section area Ain is of about 2.9. A length L11 of the eleventh section 71 is of about 42 mm. A ratio between a length L11 of the eleventh section 71 and the diameter Din at the inlet opening 40 is of about 0.65.

The duct 39 comprises a twelfth section 74 placed downstream of the eleventh section 71 and tapering towards the outlet nozzle 41. The twelfth section 74 presents the shape of a truncated cone, the larger base of which has an area equal to the section area A11 of the eleventh section 71. The twelfth section 74 presents a tapering angle Ω12 of about 80° and a length L12 of about 45 mm. A ratio between the length L12 of the twelfth section 74 and the diameter Din at the inlet opening 40 is of about 0.7.

Downstream of the twelfth section 74, the duct 39 presents a first labyrinth section 75. The first labyrinth section 75 is provided with a circular cross section and a constant section area A11s. The diameter D11s of the first labyrinth section 75 is of about 32 mm. The section area A1ls of the first labyrinth section 75 is of about 804 mm². A ratio between the constant section area A1ls of the first labyrinth section 75 and an inlet opening section area Ain is of about 0.25. A length L1ls of the first labyrinth section 75 is of about 180 mm. A ratio between a length L1ls of the first labyrinth section 75 and a diameter Din at the inlet opening 40 is of about 2.75. A plurality of first lamellae 76 are arranged in the first labyrinth section 75. Said plurality of first lamellae 76 are skewed with respect to the main direction "X-X" and are crossed and joined one to the other to form an honeycomb structure. Such honeycomb structure delimits a plurality of small chambers 77 communicating by means of through holes 78 made in said first lamellae 76. Said holes 78 and said small chambers 77 delimit a labyrinth passageway for the liquid flowing through the duct 39 towards the outlet nozzle 41.

A second labyrinth section 79 of the duct 39 departs from the first labyrinth section 75 and presents the shape of a truncated cone tapering towards the outlet nozzle 41. The larger base of said truncated cone has an area equal to the section area A1ls of the first labyrinth section 75. The second labyrinth section 79 presents a tapering angle γ of about 40°. A length L2ls of the second labyrinth section 79 is of about 75 mm. A ratio between a length L2ls of the second labyrinth section 79 and a diameter Din at the inlet opening 40 is about 1.2. The second labyrinth section 79 comprises a plurality of second lamellae 80 provided with through holes 81 for delimiting a plurality of small chambers 82 and a labyrinth passageway for the liquid flowing through the duct 39 towards the outlet nozzle 41. The second lamellae 80 are thinner than the first lamellae 76 and the small chambers delimited by the second lamellae 80 are smaller than the chambers 77 of the first labyrinth section 75.

The outlet nozzle 41 presents a length Lon of about 12 mm, a diameter Don of about 4.2 mm and a section area Aon of about 13.8 mm². A ratio between the constant section area Aon of the outlet nozzle 41 and an inlet opening section area Ain is of about 0.0042. A ratio between a length Lon of the outlet nozzle 41 and a diameter Din at the inlet opening 40 is of about 0.19.

Auxiliary mixing devices 22', 22", 22'" provided with the same structure detailed above may be installed in the first conduit 9, downstream of the first pump 10 and upstream of the connection point 14, and/or in the second conduit 12, downstream of the second pump 13 and upstream of said connection point 14, and/or in the third conduit 17, downstream of the third pump 18.

A control unit, not shown, is operatively connected to pumps 10, 13, 18, 32, 36 and valves 23, 25, 29, 33, 37, 38, to heating elements and to suitable sensors (of temperature, pressure, flow, ecc.) operatively connected to the apparatus 1 in order to control the process for preparing a water/diesel oil micro-emulsion implemented by said apparatus 1.

In use and according to the process of the invention for preparing a water/diesel oil micro-emulsion, a predetermined amount of diesel oil is pumped by means of the first pump 10 into the mixing tank 5 while the first valve 23 is open and the third, the fifth and the sixth valves 29, 37, 38 are closed.

The diesel oil may be any hydrocarbon admixture including paraffins, aliphatic hydrocarbons and cyclic hydrocarbons, derived from fractional distillation of petroleum (petroldiesel). Generally, diesel oils have boiling points ranging from about 170° C. to about 390° C. In alternative, synthetic diesel not derived from petroleum such as biodiesel, biomass to liquid (BTL), gas to liquid (GTL) and Coal To Liquid (CTL) may be used.

The predetermined amount of diesel oil may be of about 3600 liters. The flow rate of diesel oil flowing through the first conduit 9 may be of about 10 L/s. If the mixing the device 22' in the first conduit 9 is present, the diesel oil flows through said mixing the device 22' before reaching the connection point 14.

While pumping the diesel oil, a predetermined amount of the emulsifying composition is pumped by the second pump 13 into the first conduit 9 at the connection point 14.

The emulsifying composition comprises:
1) from 20.0 to 33.0% by weight of at least a non-ionic polymer selected among polyglycerides of mono-, di- and tri-glycerides of fatty acids, polyethylene glycols, polyvinyl alcohols, polyvinylpyrrolydone (PVP), vinylpyrrolidone (VP)/vinyl acetate (VA) copolymers, vinyl methacrylate (VMA)/acrylamide (AM) copolymers, ethyl-, ethylmethyl-, ethylhydroxy-, hydroxyl-, methyl-, hydroxypropyl-cellulose, natural gums—such as karaya gum, tragacanth gum, carob bean gum—and admixtures thereof;
2) from 6.0 to 10.0% by weight of at least a lipophilic non-ionic surfactant, having HLB lower than 7;
3) from 15.8 to 29.0% by weight of at least a hydrophilic non-ionic surfactant having HLB higher than 10;
4) from 6.6 to 11.5% by weight of at least an anionic surfactant selected among sulfates, sulfonates, phosphates and carboxylates salts;
5) from 9.8 to 16.5% by weight of at least an amphoteric surfactant.
6) a lubricant;
7) an octane booster;
8) an anti-freezing agent;
9) a stabilizer;
10) an antifoam agent;
11) an adjuvant agent.

The predetermined amount of the emulsifying composition may be of about 35.40 liters. The flow rate of emulsifying composition flowing through the second conduit 12 may be of about 0.098 L/s.

The emulsifying composition is heated by the heating elements to a controlled temperature of about 20° C. In this way, a pre-mixing of the diesel oil with the emulsifying composition is achieved during flowing through the common conduit 15. If the mixing the device 22" in the second conduit 12 is present, the emulsifying composition flows through said mixing the device 22" before reaching the connection point 14 and before pre-mixing with the diesel oil.

The control unit controls and drives the pumps 10, 13 in order to obtain a correct and predefined ratio between the emulsifying composition and the diesel oil to be pre-mixed.

The pre-mixed diesel oil and emulsifying composition flow through the mixing device 22 of the common conduit 15 just before the mixing tank 5.

The mixing tank 5 is filled with the predetermined amount of pre-mixed diesel oil and emulsifying composition. The time required to fill the mixing tank 5 with said predetermined amount of diesel oil and with said predetermined amount of emulsifying composition may be of about 6 min.

After said predetermined amount is reached, the first and second pumps 10, 13 are stopped and the third pump 18 is controlled by the control unit to pump a predetermined amount of demi-water into the mixing tank 5.

The predetermined amount of demi-water may be of about 1350 liters.

The flow rate of demi-water flowing through the third conduit 17 may be of about 7.5 L/s. The time required to fill the mixing tank 5 with said predetermined amount of demi-water may be of about 3 min.

The demi-water is heated by the heating elements to a controlled temperature of about 20° C. The predetermined amount of demi-water is sprayed by means of the nozzle head 24 and falls like rain into the pre-mixed diesel oil and emulsifying composition contained in the mixing tank 5. The pressure of the demi-water entering the mixing tank 5 may be of about 12 bar.

The third pump 18 is then stopped. The overall time required for filling the mixing tank 5 is of about 9 min.

At this stage, the overall batch comprising the diesel oil, the emulsifying composition and the demi-water may be of about 5000 liters (more precisely 4985.4 liters).

The percentage of diesel oil, emulsifying composition and demi-water of the batch in the mixing tank 5 may be as follows:

diesel oil—about 72.2%;
emulsifying composition—about 0.7%;
demi-water—about 27.1%.

After filling the mixing tank 5, the batch is recirculated a number of times by means of the recirculation conduit 6. The first and second valves 23, 25 are closed and the first, second and third pumps 10, 13, 18 are not working. The fourth and sixth valves 33, 38 are closed too while the fifth valve 37 is open. The control unit controls the fourth pump 32 to pump the batch from the mixing tank 5 and the reservoir 30 through the recirculation duct 6 into the mixing tank 5 again passing through the mixing device 22.

Recirculation through the mixing device 22 is performed for a number of times of about 10 (ten). The flow rate entering the mixing device 22 during this recirculation through the mixing device 22 may be of about 83.09 L/s. The pressure of fluid entering the mixing device 22 may be of about 120 bar. The time required for performing this recirculation is of about 10 min (about 1 min for each loop).

At the end of the recirculation steps performed through the mixing device 22, the batch is recirculated for at least one time through the bypass conduit 27. To this aim, the third valve 29 is closed and the fourth valve 33 is open. The fourth pump 32 pumps the batch from the mixing tank 5 and the reservoir 30 through the recirculation duct 6 into the mixing tank 5 again, passing through said bypass conduit 27. The flow rate of the batch flowing through the recirculation conduit 6 and the bypass conduit 27 may be of about 2.4 L/s. The pressure of fluid through the recirculation conduit 6 and the bypass conduit 27 may be of about 2 bar. The time required for performing this last recirculation is of about 35 min.

Eventually, during the recirculation steps, a sample of the batch could be drawn off through discharge tap 34 in order to perform quality control measures.

At the end of all the recirculation steps, the fuel micro-emulsion batch is discharged through the discharge conduit 7. The fifth valve 37 is closed and the sixth valve 38 is open. The control unit controls the fifth pump 36 to pump the batch from the mixing tank 5 and the reservoir 30 to the terminal end 35 of the discharge conduit 7. The process can be started again with another batch to be emulsified.

The invention claimed is:

1. A device for emulsifying a mixture of water and diesel oil, the device comprising:

at least one duct for flow of a liquid mixture, said duct extending along a main direction and including an inlet opening for receiving the liquid mixture and an outlet nozzle;

a cone-shaped septum extending across the duct, and dividing the duct into an upstream portion and a downstream portion, the cone-shaped septum comprising a conical wall that is coaxial with respect to the main direction and. tapering inwards towards the outlet nozzle;

a first plurality of holes extending through the conical wall of the cone-shaped septum, for the flow of the liquid mixture from the upstream portion of the duct to the downstream portion of the duct;

a plurality of lamellae extending across the duct in a labyrinth section of the downstream portion of the duct, said plurality of lamellae dividing the duct into a plurality of chambers; and a second plurality of holes extending through the lamellae between the plurality of chambers, wherein said second plurality of holes and said plurality of chambers delimit a labyrinth passageway for the flow of the liquid mixture through the duct towards the outlet nozzle.

2. The device of claim 1, wherein the duct includes a single inlet opening.

3. The device of claim 1, wherein the cone-shaped septum extends across the full width of the duct.

4. The device of claim 1, wherein at least part of the labyrinth section tapers inwards towards the outlet nozzle.

5. The device of claim 4, wherein at least part of the labyrinth section has constant section area.

6. The device of claim 5, further comprising:

a first lamellae of said plurality of lamellae arranged in the part of the labyrinth section having constant section area; and a second lamellae of said plurality of lamellae arranged in the tapering part of the labyrinth section.

7. The device of claim 6, wherein the second lamellae are thinner than the first lamellae, and the chambers farmed by the second lamellae have smaller volume than the chambers formed by the first lamellae.

8. The device of claim 1, wherein the plurality of lamellae form a honeycomb structure.

9. The device of claim 1, wherein the first plurality of holes extend perpendicular to the conical wall.

10. The device of claim. 9, wherein the first plurality of holes extend at an angle of between 50 degrees and 90 degrees to the main direction.

11. The device of claim 1, further comprising:

an inlet septum between the inlet opening and the cone-shaped septum; and a third plurality of holes extending through the inlet septum, for the flow of the liquid mixture.

12. The device of claim 11, further comprising:

an intermediate septum between the inlet septum and the cone-shaped septum; and.

a fourth plurality of holes extending through the intermediate septum, for the flow of the liquid mixture.

13. The device of claim 11, further comprising:

an auxiliary septum between the cone-shaped septum and the labyrinth section; and a. further plurality of holes extending through the auxiliary septum, for the flow of the liquid mixture.

14. The device of claim 1, wherein the duct comprises a plurality of divergent and convergent sections.

15. A process for preparing a water/diesel oil micro-emulsion, comprising:

feeding a predetermined amount of a diesel oil into a mixing tank;
feeding a predetermined amount of an emulsifying composition into the mixing tank;
feeding a predetermined amount of water into the mixing tank;
recirculating the batch in the mixing tank comprising said diesel oil, said emulsifying composition and said water through a recirculation conduit including a mixing device; and
discharging the fuel micro-emulsion batch,
wherein the mixing device comprises:
at least one duct for flow of a liquid mixture, said duct extending along a main direction and including an inlet opening for receiving the liquid mixture and an outlet nozzle;
a cone-shaped septum extending across the duct, and dividing the duct into an upstream portion and a downstream portion, the cone-shaped septum comprising a conical wall that is coaxial with respect to the main direction and tapering inwards towards the outlet nozzle;
a first plurality of holes extending through the conical wall of the cone-shaped septum, for the flow of the liquid mixture from the upstream portion of the duct to the downstream portion of the duct;
a plurality of lamellae extending across the duct in a labyrinth section of the downstream portion of the duct, said plurality of lamellae dividing the duct into a plurality of chambers; and
a second plurality of holes extending through the lamellae between the plurality of chambers, wherein said second plurality of holes and said plurality of chambers delimit a labyrinth passageway for the flow of the liquid mixture through the duct towards the outlet nozzle.

16. The process of claim 15, wherein the diesel oil and emulsifying composition are pre-mixed, and the pre-mixed diesel oil and emulsifying composition are then fed into the mixing tank.

17. The process of claim 16, wherein the pre-mixed diesel oil and emulsifying composition are fed into the mixing tank through the mixing device.

* * * * *